United States Patent
Lambert et al.

(10) Patent No.: US 10,010,968 B2
(45) Date of Patent: Jul. 3, 2018

(54) FRICTION STIR WELDING TOOL COMPRISING A RETRACTABLE GUIDE MEMBER AND A WELDING PROCESS

(71) Applicant: AEROLIA, Toulouse (FR)

(72) Inventors: Olivier Lambert, Lahoussoye (FR); Guillaume Luc, Doullens (FR)

(73) Assignee: AEROLIA, Toulouse (FR)

( * ) Notice: Subject to any disclaimer, the term of this patent is extended or adjusted under 35 U.S.C. 154(b) by 82 days.

(21) Appl. No.: 14/867,884

(22) Filed: Sep. 28, 2015

(65) Prior Publication Data
US 2016/0089748 A1 Mar. 31, 2016

(30) Foreign Application Priority Data

Sep. 29, 2014 (FR) ...................................... 14 59174

(51) Int. Cl.
*B23K 20/12* (2006.01)

(52) U.S. Cl.
CPC ........ *B23K 20/1205* (2013.01); *B23K 20/126* (2013.01); *B23K 20/129* (2013.01); *B23K 20/1245* (2013.01)

(58) Field of Classification Search
CPC ............ B23K 20/1205; B23K 20/1245; B23K 20/126; B23K 20/129
See application file for complete search history.

(56) References Cited

U.S. PATENT DOCUMENTS

| | | | |
|---|---|---|---|
| 6,299,050 B1* | 10/2001 | Okamura | B23K 20/123 156/73.5 |
| 9,079,270 B2* | 7/2015 | Kato | B23K 20/1245 |
| 2005/0092817 A1* | 5/2005 | Baumann | B23K 20/126 228/212 |
| 2008/0084018 A1 | 4/2008 | Baumann et al. | |
| 2012/0006883 A1* | 1/2012 | Nishida | B23K 20/123 228/112.1 |
| 2013/0255884 A1* | 10/2013 | Baumann | B23Q 3/16 156/538 |
| 2017/0151626 A1* | 6/2017 | Larsson | B23K 20/126 |

FOREIGN PATENT DOCUMENTS

| | | |
|---|---|---|
| FR | 2996154 A1 | 4/2014 |
| JP | 2007125598 | 5/2007 |

* cited by examiner

*Primary Examiner* — Erin B Saad
*Assistant Examiner* — Carlos J Gamino
(74) *Attorney, Agent, or Firm* — Klein, O'Neill & Singh, LLP

(57) ABSTRACT

A friction stir welding tool with a base, a rotating friction stir slug mounted in the said base and at least one guide member connected to the said base, the welding tool being adapted to move from upstream to downstream; a welding tool having at least one displacement member of the guide member relative to the said base between at least one guiding position in which the guide member extends in a scout area located downstream and facing the friction stir slug and at least one retracted position in which the guide member is offset from the said scout area.

14 Claims, 2 Drawing Sheets

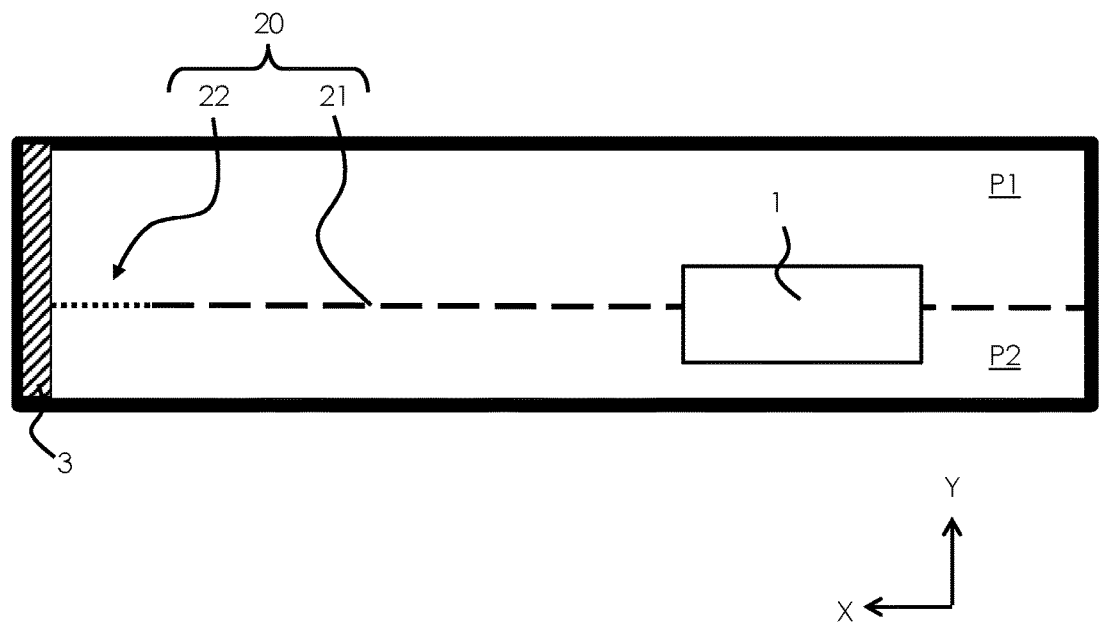
FIGURE 1 - PRIOR ART -
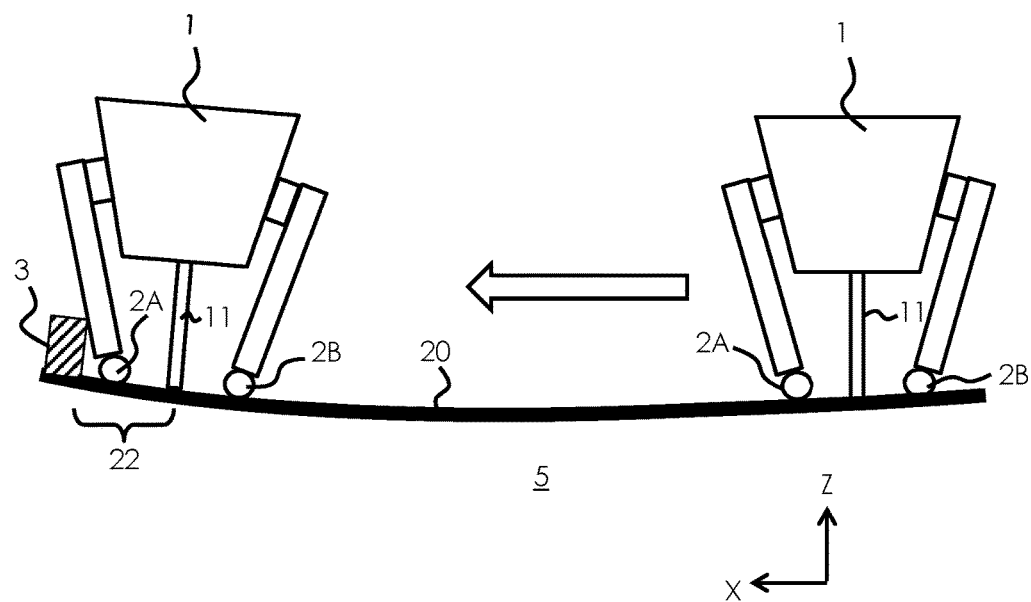
FIGURE 2 - PRIOR ART -

FRICTION STIR WELDING TOOL COMPRISING A RETRACTABLE GUIDE MEMBER AND A WELDING PROCESS

GENERAL TECHNICAL FIELD AND PRIOR ART

This invention relates to the field of welding of fuselage panels of an aircraft, and more particularly, the friction stir welding for joining panels of the nose of the fuselage of an aircraft. The soudage par friction malaxage (French) is known to those skilled in the art under its English name "Friction Stir Welding" or "FSW".

The nose of an aircraft fuselage is manufactured in a known manner by the edge to edge joining of multiple structural panels. To do this, the edges of the panels to be joined are first machined separately and then welded together.

During the implementation of a method involving friction stir welding of two panels to be joined, the latter are first held firmly against each other on an anvil. Then, a welding tool comprising a friction stir slug is pressed into the material at the interface of the two panels. The pressing force applied continuously by the slug and the rotation of said slug generate friction and mastication which heat the material of the panels at the interface of the two panels. Due to this heating, the material of the panels at their interface is deformed plastically and acquires a paste-like property. By cooling and crystallisation of the paste-like material, a welding bead is formed at the interface of the two panels to connect them integrally. As the material is still in the paste-like state without becoming liquid, the mechanical properties of said panels suffer minimum damage.

For example, with reference to FIGS. 1 and 2, there are two panels P1, P2 arranged on an anvil 5 (FIG. 2) acting as a counter-brace during the friction stir welding. The panels P1, P2 are held firmly against each other so as to form between them an interface line 20. For securing the panels P1, P2, they must be welded along the said interface line 20.

Thereafter, the figures are represented in the orthogonal coordinate system X, Y, Z wherein the X axis extends horizontally from right to the left, the Y axis extends laterally from front to back while the Z axis extends vertically from the bottom upwards. In this example, the interface line 20 extends in the plane (X, Z) and is curvilinear for welding the nose fuselage panels P1, P2 of curved shapes.

Referring to FIGS. 1 and 2, there is a welding tool 1 for welding the panels P1, P2 by friction stir welding along the interface line 20. In a known manner, the welding tool 1 comprises a friction stir slug 11 adapted to be rotated and supported on the interface line 20 in order to heat the material of the panels P1, P2 and allow the welding. The welding tool 1 is pressed firmly against the interface line 20 in order to press the panels P1, P2 against the anvil 5. In practice, the friction stir slug 11 of the welding tool 1 is oriented normally in relation to the interface line 20 in order, firstly, to optimally press the panels P1, P2 against the anvil 5 and, secondly, to generate an optimal friction during the rotation of the friction stir slug 11 with the panels P1, P2. In practice, the supporting force of the slug 11 is between 6000 and 20000 Newton.

In order to follow the profile of the interface line, particularly when it is curvilinear, the welding tool comprises at least one guide member, such as a 'galet' or a 'rouleau' (French) designated by those skilled in the art by its English name "roller", which is integral with the welding tool. Such a machining tool is for example known from the patent application US2009250505A1.

For example, with reference to FIG. 2, there is a welding tool 1 adapted to move in an upstream to downstream direction (from right to left as per the X direction or more generally from a first point to a second point and spaced by a distance) and which comprises a downstream guide member 2A that extends in a scout area located downstream and facing the friction stir slug 11 as well as an upstream guide member 2B that extends in a trail area located upstream and facing the friction stir slug 11. The area facing the friction stir slug 11 refers to an area located substantially in the transverse plane passing through the said friction stir slug 11.

Referring to FIG. 2, the friction stir slug 11 of the welding tool 1 is stabilised by the guide members 2A, 2B positioned downstream and upstream of the friction stir slug 11 respectively and at a predetermined distance from the latter. In practice, each guide member 2A, 2B is at the same vertical height as the friction stir slug 11 and spaced from the latter along the horizontal X axis by a distance of about 5-10 cm.

Thus, upon the upstream to downstream movement of the welding tool 1, that is to say from the right to the left, the guide members 2A, 2B help adjust the vertical height of the friction stir slug 11 and its inclination so that the friction stir slug 11 extends normally to the interface line 20 during welding.

A problem arises when one or more panels (P1, P2) comprise(s) a barrier 3 as illustrated in FIGS. 1 and 2. This barrier 3 forms a raised portion and may correspond to a mounting clip of a panel, a stiffener, a stringer, etc. Such barriers 3 are generally present at an end of a panel (P1, P2) as shown in FIG. 1.

Referring to FIG. 2, owing to its size, the welding tool 1 cannot weld the interface line 20 throughout its length; the barrier 3 prevents the welding of a portion 22 of the interface line 20. In practice, with reference to FIG. 1, a first portion 21 of the interface line 20 is welded using the welding tool 1 while a second portion 22 of the interface line 20, located near the barrier 3 cannot be joined in the same manner.

A first solution to solve this problem is to use a second welding tool having a different shape to weld the second portion 22 of the interface line 20. Such a solution has the disadvantage of forming a non-uniform welding bead. In addition, the mechanical characteristics of panels P1, P2 are severely damaged at the junction of the first portion 21 and second portion 22 of the interface line 20. For these reasons, such a solution cannot be adopted.

A second solution to solve this problem is to secure the second portion 22 of the interface line 20 using additional fastening means, particularly rivets. Such a solution has the disadvantage of forming a non-uniform connection of the interface line 20. Furthermore, in addition to its long duration of implementation, this solution has the drawback of increasing the mass of the structural panels P1, P2 because of the additional fastening means, which is disadvantageous.

In order to eliminate at least some of these disadvantages, we propose a welding tool and a welding process for welding an interface line throughout its length despite the presence of a barrier on one or more panels to be joined.

SUMMARY

To this end, the invention concerns a friction stir welding tool comprising a base, a rotating friction stir slug mounted in the said base and at least one guide member connected to the said base, the welding tool being adapted to move from an upstream location to a downstream location, or from a first point to a second point. The friction stir slug being positionable to a welding position to weld an interface line between two surfaces or two panels. The interface line can be straight, can include a curve, or combinations thereof The welding tool is advantageous in that it comprises at least one displacement member of the guide member relative to said base between at least one guiding position in which the guide member extends in a scout area located downstream and facing the friction stir slug and at least one retracted position in which the guide member is offset from the said scout area.

Thanks to the displacement member, the guide member, for example a roller, can be moved from a guiding position to a retracted position to avoid a barrier during welding. Thus, the welding tool can fully weld an interface line of two surfaces or two panels with the same welding tool during the same welding step. Such a welding tool is particularly advantageous for welding two panels having a barrier at their ends, for example a mounting clip. The guide member helps guide the friction stir slug during the welding of the central portions of the panels and is retracted only during the welding of the end of the panels for which a guide is not critical. Thus, the guide is optimal in the absence of barriers. In the presence of barriers, the guiding is reduced or eliminated in order to facilitate the passage of the friction stir slug.

Preferably, in the retracted position, the guide member is offset vertically in an upward direction relative to the said scout area. For example, the friction stir slug can be positioned to weld an interface line of two panels at a welding position and the guide member can be offset in the retracted position by moving vertically of the welding position of the friction stir slug.

In an example, the guide member is moved vertically so that a lower end of the guide member is spaced from the two panels having the interface line to be welded. Thus, the guide member can advantageously extend over the barrier to be avoided. In addition, a vertical movement is simpler to implement. When the welding tool is moved from an upstream position to a downstream position to weld the interface line, the guide member of the downstream side of the friction stir slug can be moved to the retracted position so that its lower end is spaced from the two panels or two surfaces having the interface line to be welded.

Preferably, the displacement member comprises at least one shifting cylinder connecting the said guide member to the said base. Such a cylinder conventionally includes a cylinder secured to the base and a rod secured to the guide member. Such a cylinder is particularly robust.

Preferably, the displacement member is configured to force the guide member against a wall to be welded with a predetermined pressure force. Thus, the pressure force is not only provided by the friction stir slug but also by the one or more guide members, which makes it possible to adjust the pressing force as required while limiting the risk of marking of the panels by the guide member(s). In addition, the pressure forces of the friction stir slug and of the guide members may be different, thus allowing a greater adjustment depending on the shape and type of the panels to be welded. Preferably, the deformations of the panels are reduced.

More preferably, the welding tool comprises means for adjusting the predetermined pressure force. Thus, one can adjust the pressing force for each application and for each portion to be welded in order to obtain a quality weld by reducing the deformations of the panels.

In a preferred aspect, the said guide member is a guide roller. Such a guide roller is robust and helps to precisely adjust the position and inclination of the friction stir slug.

Preferably, the welding tool comprises at least two guide elements, preferably, diametrically opposed with respect to the friction stir slug. Two guide members can improve the stability and movement of the welding tool in both directions.

More preferably, the welding tool comprises detection means configured to automatically control activation of the displacement member in case of detection of a barrier downstream of the said scout area. Such detection means, for example a camera or a presence sensor, can automatically prevent all contact with a barrier and help to adapt to any type of panel to be welded.

The invention also relates to a method of joining two elements positioned against each other along an interface line by means of a friction stir welding tool having a base, a rotating friction stir slug mounted in the said base and at least one guide member connected to the said base, the method comprising:
   a friction stir welding step of the interface line of the said elements by the friction stir slug to be rotated relative to the base of the welding tool, the welding tool being moved in the downstream direction and guided by the guide member which is in contact with at least one of said elements in a scout area located downstream and facing the friction stir slug; and
   a displacement step of the guide member relative to the friction stir slug in a retracted position so that the guide member is offset relative to the said scout area.

Thanks to the method of the invention, the guide member can be moved from a guiding position to a retracted position to avoid a barrier during welding. Thus, the welding tool can fully weld an interface line of two panels with the same welding tool during the same welding step while ensuring adequate pressing of the elements. Preferably, the said elements may be in the form of two panels, a stiffener or a single panel, etc.

Preferably, the displacement step of the said guide member is carried out during the upstream to downstream displacement of the said welding tool. Preferably, the welding tool moves in the downstream direction at constant speed. In other words, it is not necessary to stop the welding step for retracting the guide member. This is particularly advantageous for obtaining a uniform welding bead between the guided and non-guided portions. Such a uniform welding bead has an improved service life.

More preferably, the said guide member is not in contact with the said elements in the retracted position. Thus, it no longer contributes to the pressing of the elements.

Preferably, the displacement step of the said guide member is executed automatically upon detection of a barrier downstream of the said scout area.

BRIEF DESCRIPTION OF THE DRAWING FIGURES

The invention will be better understood on reading the description which will follow, given solely as an example and with reference to the accompanying figures in which:

FIG. 1 is a schematic top view of two fuselage panels and a friction stir welding tool according to the prior art;

FIG. 2 is a schematic top view of two fuselage panels and a friction stir welding tool according to the prior art during a welding step;

It must be noted that the figures provide a detailed description of the invention in order to implement the invention; the said figures may be used to better define the invention if necessary.

DETAILED DESCRIPTION

Figure 3:
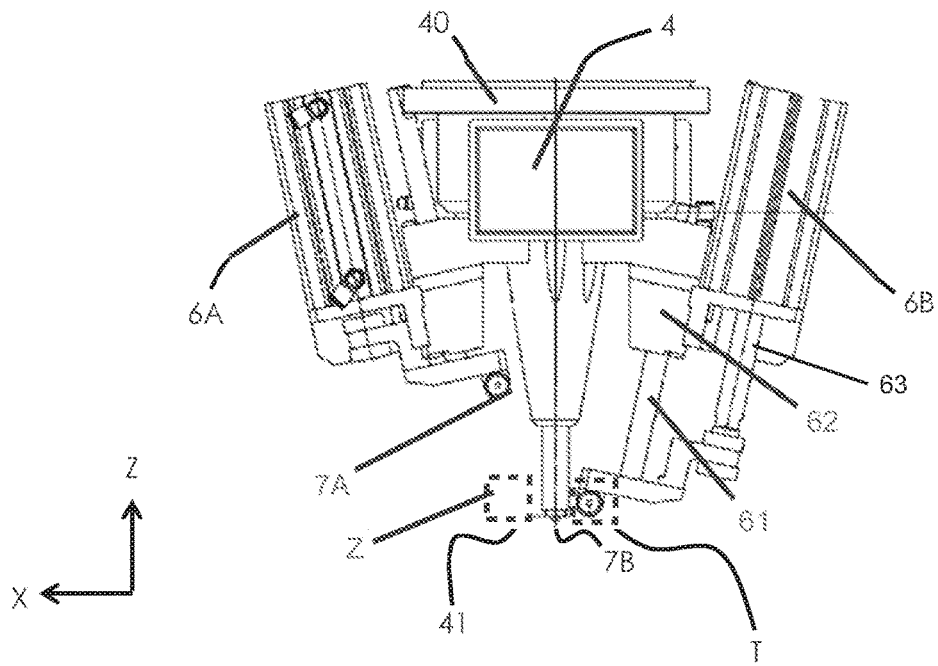
FIG. 3 is a schematic side view of a welding tool according to the invention.

Referring to FIG. 3, there is a welding tool 4 according to the invention which comprises a base 40 and a rotating friction stir slug 41 mounted in the said base 40. The friction stir slug 41 is positionable to a welding position to perform a weld along an interface line of two surfaces to be joined, such as two panels. For example, the friction stir slug can move to the welding position to perform a weld and can retract away from the welding position. Such a structure is known to those skilled in the art and will not be discussed in more detail.

The welding tool 4 is adapted to move longitudinally in the downstream direction along the X axis oriented from upstream to downstream.

According to the invention, the welding tool 4 comprises two guide members 7A, 7B connected to the said base 40 which are mounted upstream and downstream respectively of the friction stir slug 41 as shown in FIG. 3. In other words, the guide members 7A, 7B are diametrically opposed relative to each other with respect to the friction stir slug 41. In this example, the guide members 7A, 7B are identical and are each in the form of a guide roller known per se to those skilled in the art.

Referring to FIG. 3, the welding tool 4 includes a displacement member 6A, 6B associated with each guide member 7A, 7B to move it in relation to the said base 40. Preferably, the displacement member 6A, 6B associated with each guide member 7A, 7B is in the form of a cylinder, preferably, a hydraulic cylinder. However, it goes without saying that other displacement members 6A, 6B may be suitable, for example, a pneumatic device, a ball joint coupling device, etc. Preferably, each guide member 7A, 7B is controlled by a push button.

Thus, the references 6A, 6B include both the displacement members as well as the cylinders.

Still referring to FIG. 3, the welding tool 4 thus includes a downstream cylinder 6A and an upstream cylinder 6B which connect the base 40 to the downstream guide member 7A and to the upstream guide member 7B respectively. Each cylinder 6A, 6B comprises a barrel 62 secured to the base 40 and a first rod 61, secured to the guide member 7A, 7B, which is slidably mounted in the said barrel 62 along a translation axis. Additionally, a second rod 63 can be secured to the guide member 7A, 7B, wherein the second rod 63 is movable in unison with the first rod 61. In other words, a guide member 7A, 7B can slide along the translation axis. Preferably, the angle 13 between the axis of the friction stir slug 41 and the translation axis of each displacement member 6A, 6B is between 10° and 20° so as to ensure a supporting force extending as close as possible to the normal direction of the welding surface.

According to the invention, each guide member 7A, 7B can be moved between at least one guiding position in which the guide member 7A, 7B extends opposite the friction stir slug 41, that is to say, in the welding plane extending orthogonally to the axis of the friction stir slug 41, and at least one retracted position.

Figure 4:
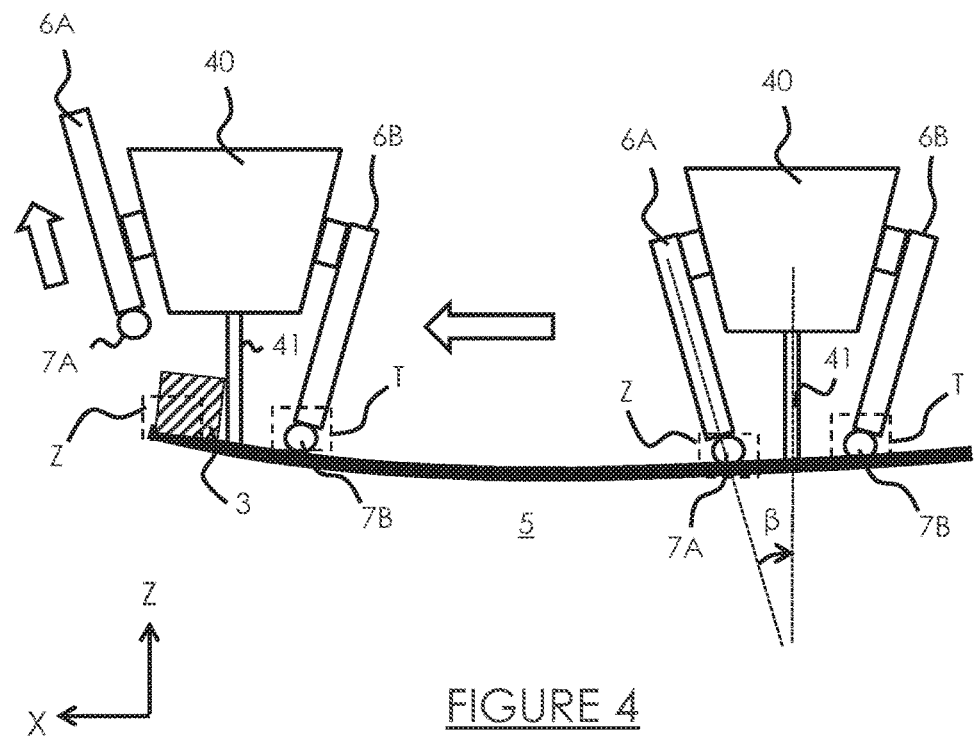
FIG. 4 is a schematic representation of two fuselage panels and a friction stir welding tool during a welding step.

Referring to FIG. 4 (right side), in the guiding position, the downstream guide member 7A extends in a Z scout zone located downstream and facing the friction stir slug 41 while, in the same position, the upstream guide member 7B extends in a T trail area located upstream and facing the rotary slug 41. In other words, in the guiding position, each guide member 7A, 7B is in the immediate vicinity of the friction stir slug 41.

In this example, in the guiding position, each guide member 7A, 7B extends to the same vertical height as the friction stir slug 41 and, preferably within 3 cm of the latter in the longitudinal X direction according to which the welding tool 4 moves.

Referring to FIG. 3, in the retracted position, the downstream guide member 7A is offset from the said scout area Z. Similarly, in the same position, the upstream guide member 7B is offset from the said trail area T (not shown in the figures). In other words, in the retracted position, a guide member 7A, 7B is spaced from the friction stir slug 41.

In this example, in the retracted position, a guide member 7A, 7B extends to a vertical height that differs from that of the friction stir slug 41, preferably more than 5 cm, or more than 8 cm. Preferably, the longitudinal distance between a guide member 7A, 7B and the friction stir slug 41 is greater in the retracted position than in the guiding position due to the inclination $\beta$ between the axis of the friction stir slug 41 and the translation axis of each displacement member 6A, 6B.

Alternatively, in the retracted position, a guide member 7A, 7B may extend to the same vertical height as the friction stir slug 41 but may be offset laterally. To this end, the displacement member may be in the form of a ball or a sliding pin.

In a preferred aspect of the invention, the displacement member 6A, 6B associated with each guide member 7A, 7B is configured to force the said guide member 7A, 7B against a wall with a predetermined pressure force. In this case, the hydraulic pressure of each cylinder 6A, 6B can be controlled in order to apply a predetermined pressure force on the panels P1, P2 so as to immobilise them firmly against an anvil 5 during welding as will be presented below. Thus, each guide member 7A, 7B can apply a pressure force that is independent of the pressure force applied by the friction stir slug 41, which helps improve the pressing of the panels P1, P2 without altering the quality of the friction stir welding. In practice, each guide member 7A, 7B can apply a pressure force between 0 and 3.3 kN, preferably 1 kN.

Preferably, the welding tool 4 comprises detection means (not shown) for automatically controlling movement of at least one of the guide members 7A, 7B in the retracted position in case of detection of a barrier 3 so that the barrier 3 does not come into contact with the guide members 7A, 7B. The detection means are preferably in the form of a detector camera, but it is understood that other detection means may be suitable, for example, a presence sensor, a range finder, an inductive sensor, etc.

The invention has been presented for a welding tool 4 having only two guide members 7A, 7B but it goes without saying that the invention also applies to a welding tool 4 having only one guide member or more than two guide members.

An example of implementation of a method of joining two panels according to the invention will now be presented with reference to FIG. 4.

As illustrated in FIG. 4, the welding tool 4 moves in the downstream direction (right to left in FIG. 4) along an interface line 20 formed between two panels P1, P2 placed against each other on an anvil 5 as illustrated for example in FIG. 1; the anvil 5 acts as a counter-brace. During its movement, the friction stir slug 41 is rotated relative to the base 40 of the welding tool 4 and comes into contact with the material of the two panels P1, P2 so as to perform a welding step.

During the welding step, the guide members 7A, 7B are in the guiding position and come into contact with at least one of the said panels P1, P2 in order to press them against the anvil 5. Preferably, the pressure force provided by each guide member 7A, 7B is adjusted to ensure optimum pressing of the panels P1, P2 against the anvil 5. In this example, the hydraulic pressure provided to each hydraulic cylinder 6A, 6B is adapted to achieve the desired pressure force.

Given the presence of a barrier 3 at the downstream end of the interface line 20, the method includes a step of moving the downstream guide member 7A in its retracted position such that the downstream guide member 7A is offset relative to the scout area Z. As illustrated in FIG. 4, the downstream guide member 7A is offset vertically in an upwards direction by the downstream displacement member 6A to no longer be in contact with the panels P1, P2 and to extend over the barrier 3. A vertical deflection of over 8 cm preferably allows the downstream guide member 7A to pass over a mounting clip of a vertical height of 6 cm.

Thus, the friction stir slug 41 can weld the interface line 20 until it reaches the barrier 3. It is preferably no longer necessary to use additional fastening means as in the prior art.

Preferably, the upstream guide member 7B remains in the guiding position to retain a pressure force on the panels P1, P2. The guiding by a single guide member 7B presents no problem when the barrier 3 is located at one end of a panel P1, P2, given that the pressing force necessary for pressing an end of a panel P1, P2 is lower.

Preferably, the step of moving the said downstream guide member 7A is performed during the upstream to downstream movement of the said welding tool 4 in order to keep the same quality of welding throughout the length of the interface line 20. In other words, the displacement of the welding tool 4 does not stop during movement of the guide member 7A, 7B but is performed in a single pass to obtain a high quality welding bead. Preferably, the welding tool 4 is moved in the downstream direction at constant speed. Thus, the mechanical properties of the panels are not adversely affected during welding.

Preferably, when the welding tool 4 comprises automatic detection means, the step of moving the said downstream guide member 7A is performed without an operator in case of detection of a barrier downstream of the said scout area Z. Thus, this speeds up the welding of the panels having barriers located at different positions.

If the welding tool 4 is moved in the opposite direction from downstream to upstream (to the right with reference to FIG. 4), the upstream guide member 7B may also be retracted to avoid a barrier 3. In other words, the welding tool 4 according to the invention can preferably be used in both directions in order to accelerate welding of multiple panels. Alternatively, the base 40 of the welding tool 4 can be rotated 180° when only the downstream guide member 7A is linked to a downstream displacement member 6A so as to avoid a barrier 3 during a movement from left to right.

The invention has been presented for the assembly of two panels but it is understood that it applies to the assembly of various components, in particular, the assembly of a stiffener on a panel.

The invention claimed is:

1. A friction stir welding tool comprising:
a base, a rotating friction stir slug mounted with said base and positionable in a welding position to weld an interface line of a first surface and a second surface, an upstream guide member connected to said base, and a downstream guide member connected to said base, and wherein the welding tool is movable from an upstream location to a downstream location when moving along a surface to be welded;
a displacement member coupled to the downstream guide member, the displacement member comprising a hydraulic cylinder comprising a barrel secured to the base, a first rod secured to the guide member which is slidably mounted in the said barrel along a translation axis, and a second rod secured to the guide member and movable in unison with the first rod; and
wherein the downstream guide member is extendable to contact a downstream guided surface located downstream of the friction stir slug in an extended position, and the downstream guide member has a retracted position in which the downstream guide member is offset vertically in an upward direction relative to said downstream guided surface such that the downstream guide member is spaced from said downstream guided surface and positioned vertically of said welding position of said friction stir slug, and, in the retracted position, the downstream guide member extends to a vertical height that differs from that of the friction stir lug more than 5 cm.

2. The welding tool according to claim 1, wherein the downstream guide member has a translation axis relative to an axis of the friction stir slug of between 10° and 20°.

3. The welding tool according to claim 1, wherein the displacement member comprises at least one shifting cylinder connecting the downstream guide member to the base.

4. The welding tool according to claim 1, wherein the displacement member is configured to press the downstream guide member against the first surface, the second surface, or both the first and second surfaces with a predetermined pressure force.

5. The welding tool according to claim 1, wherein said downstream guide member is a guide roller.

6. The welding tool according to claim 1, wherein the upstream and downstream guide members are diametrically opposed with respect to the friction stir slug.

7. The welding tool according to claim 1, further comprising a detector for detecting a barrier downstream of said downstream guided surface.

8. The welding tool according to claim 1,
wherein the friction stir welding tool is movable from the upstream position to the downstream position along the interface line of the first and second surfaces;
wherein the friction stir slug is rotatable relative to the base of the welding tool; and
wherein the welding tool is guided along the interface line with the upstream and downstream guide members such that both upstream and downstream guide members are in contact with at least one of said first and second surfaces and said downstream guide member is in contact with at least one of said first and second surfaces at the downstream guided surface located downstream of the friction stir slug.

9. The welding tool according to claim 8, wherein said downstream guide member is displaced during the moving of said welding tool from the upstream position to the downstream position.

10. The welding tool according to claim 8, wherein only one of said upstream guide member or said downstream guide member is displaced in the retracted position.

11. The welding tool according to claim 8, further comprising a barrier located downstream of the downstream guide member and wherein said downstream guide member is displaced in the retracted position to avoid said barrier.

12. The welding tool according to claim 8, wherein the two surfaces to be joined are fuselage panels.

13. The welding tool according to claim 12, wherein said barrier is located at one end of the fuselage panels.

14. The welding tool according to claim 8, wherein the friction stir welding tool is rotatable so that a displacement member is rotated from a downstream position to an upstream position.

* * * * *